April 25, 1939.  E. W. NOXON ET AL  2,155,952
APPARATUS FOR MANUFACTURING A FOOD PRODUCT
Filed April 16, 1937
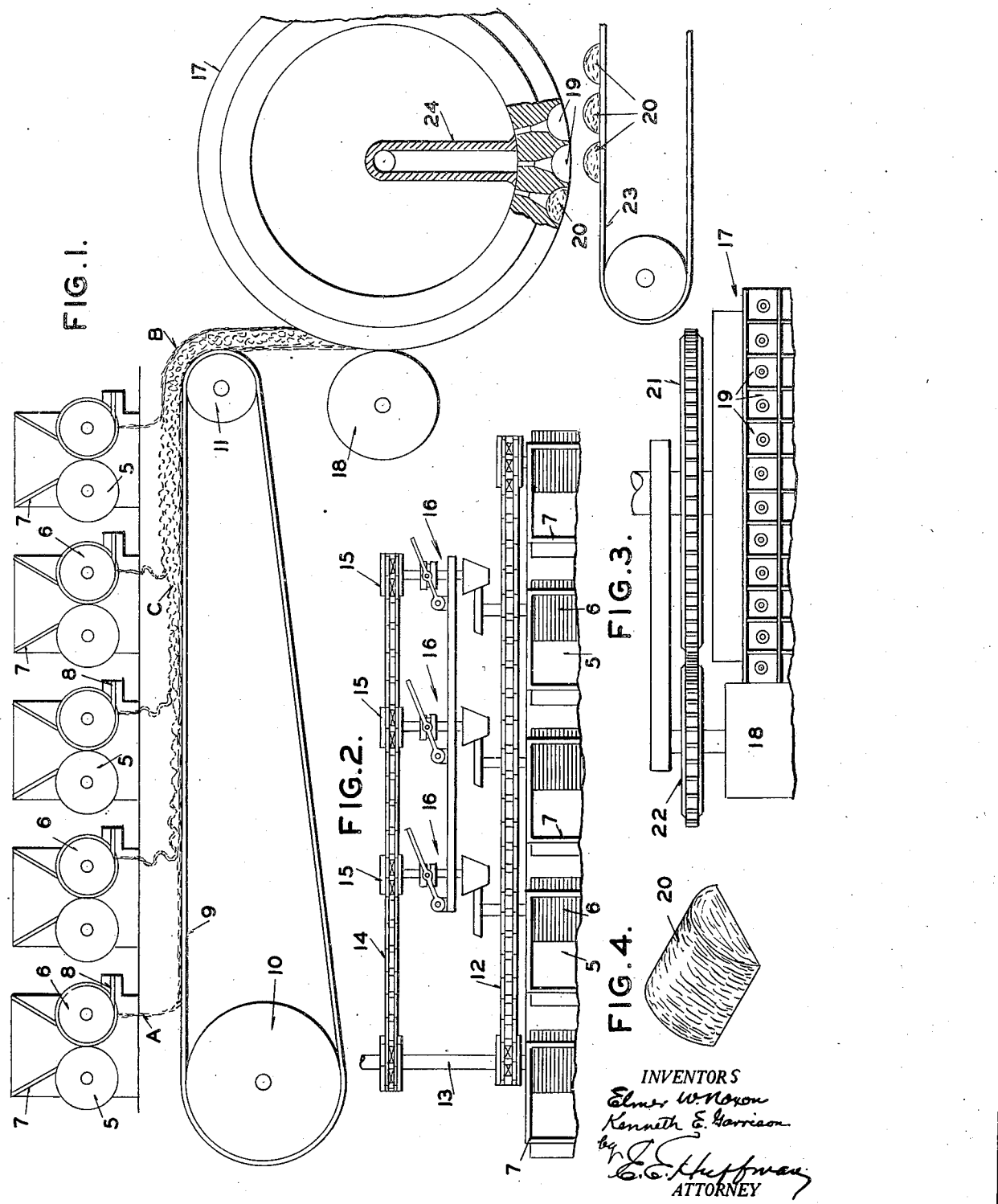

Patented Apr. 25, 1939

2,155,952

UNITED STATES PATENT OFFICE 2,155,952

APPARATUS FOR MANUFACTURING A FOOD PRODUCT

Elmer W. Noxon, Webster Groves, and Kenneth E. Garrison, St. Louis, Mo., assignors to Ralston Purina Company, St. Louis, Mo., a corporation of Missouri Application April 16, 1937, Serial No. 137,188

5 Claims. (Cl. 107—2)

Our invention relates to means for forming individual units of shredded material, such as shredded wheat, to produce a cereal food product. Such food products are usually packed in cartons containing a certain predetermined weight of the product. Heretofore great difficulty has been encountered in securing the proper relation between the size and weight of the units so that the product could be properly packed in cartons of uniform size, that is, due to variations in the shredded material itself, a given weight of the units may be found to vary in volume so as to either overfill the carton, requiring compression to the injury of the units, or may fail to completely fill it. The latter condition is also objectionable as, due to the friable nature of the units, they are likely to disintegrate through contact with each other during shipment if the carton is not full.

The object of our invention is to provide apparatus by means of which the relation between the weight and size of the units may be controlled in order to produce a uniform product notwithstanding variations in the consistency of the shredded material from which they are formed.

In the accompanying drawing, which diagrammatically illustrates one form of apparatus for carrying out our invention, Figure 1 is a side view; Figure 2 is a plan view showing driving means for the shredding devices; Figure 3 is a plan view showing driving means for the forming drum and presser roll; and Figure 4 is a perspective view of one of the units.

A series of five shredding devices are employed, each comprising a smooth roller 5 and a grooved roller 6 of the usual form. The number of these devices may, however, be varied. Wheat or other cereal, after being properly softened, is placed in the hoppers 7 of the shredding devices and after passing between the rollers is discharged in the form of shreds by any suitable means, such as combs 8 cooperating with the grooved rollers. Situated beneath the shredding devices is a traveling conveyor 9 supported by rolls 10 and 11 to one of which power is applied to drive the conveyor at a definite and fixed rate of travel. The terminal shredding devices are connected by a sprocket chain 12 so as to be driven at uniform speed. This speed is such that the layers of shredded material A and B, respectively, delivered therefrom, will travel at the same rate of speed as the conveyor. The result of this is that these shreds are deposited upon the conveyor in uniform layers in straight lines and in neither ruptured nor wrinkled condition. Interposed between the layers A and B is an intermediate layer C composed of the shreds supplied by the intermediate shredding devices. These intermediate devices are driven at a greater speed than the terminal devices so that their shreds may be delivered at a rate of speed greater than the travel of the belt with the result that they will be deposited on the belt in a wavy or wrinkled form. The speed of these devices is adjustable in order that the degree of waviness or wrinkling may be varied to control the relation between the size and weight of the completed units, as hereinafter more fully set forth. To accomplish this, a driving shaft, for example, the shaft 13 driving sprocket chain 12, drives a sprocket chain 14, which in turn drives sprocket wheels 15 to operate the intermediate shredding devices. These sprocket wheels, however, are not directly connected to said devices but to variable gears of some kind which drive the devices, as for example, the variable cone drives 16 shown in Figure 2.

The composite sheet of shreds comprising layers A, B and C, after leaving conveyor 9, passes between a forming drum 17 and a presser roll 18. In the periphery of the forming drum are recesses 19 into which the sheet of shreds is pressed by the smooth surface of roll 18 to form individual units 20. To insure this result we find it necessary to drive the drum and roll at different peripheral speeds in order to secure a shearing action between them. This we accomplish by providing the drum with a gear wheel 21 meshing with a gear wheel 22 on the roll, the relative size of these gears being such that the drum must travel at a greater peripheral speed than the roll. The formed units 20 are deposited on a traveling conveyor 23 by which they are carried to an oven (not shown) for cooking or toasting in the usual manner. Any suitable means may be used to discharge the units upon conveyor 23. We prefer to employ a nozzle 24 supplied with air under pressure by means of which the units are ejected upon the conveyor.

It is evident that by the use of the apparatus described, units of substantially uniform size and shape will be produced and, further, that the relation between bulk and weight may be controlled to secure the desired ratio. If, under given relative speeds of the terminal and intermediate shredding devices the product does not have the desired relation between weight and bulk, this relation may be varied by increasing or decreasing the speed of one or more of the intermediate devices. If the speed of the intermediate devices is decreased, the shreds of the intermediate layer C will lie more nearly in straight lines with the result that the composite sheet will have greater density. If, on the contrary, the speed of the intermediate devices is increased, the shreds of the intermediate layer will be more wavy or wrinkled, resulting in a less dense product. The relation between bulk and weight of the resultant units can thus be accurately controlled notwithstanding variation in consistency of the shredded material from which they are formed.

The unit in its final form will have the general appearance shown in Figure 4, that is, it will conform in general size and shape to recesses 19 in the forming drum. Due, however, to contraction and expansion of the shreds, particularly during cooking or toasting, the finished form will be somewhat modified, usually showing considerable rounding of the corners.

Having fully described our invention, what we claim as new and desire to secure by Letters Patent of the United States is:

1. In mechanism of the class described, the combination with a plurality of shredding devices, of a traveling conveyor upon which the shredded material from said devices is discharged, means driving one of said devices at such speed that the discharge of shredded material therefrom is at the same rate as the travel of the conveyor, and means driving another device at a higher speed.

2. In mechanism of the class described, the combination with a series of shredding devices, of a traveling conveyor upon which the shredded material from said devices is discharged, means driving the terminal devices of said series at such speed that the discharge of shredded material therefrom is at the same rate of speed as the travel of the conveyor, and means driving an intermediate device at a higher speed, whereby the shreds of the outer layers of the composite sheet of shreds formed on the conveyor will lie in straight lines and the weight of the sheet per unit of volume be decreased by reason of the shreds of an intermediate layer being deposited in wrinkled form.

3. In mechanism of the class described, the combination with a series of shredding devices, of a traveling conveyor upon which the shredded material from said devices is discharged, means driving the terminal devices of said series to discharge shredded material at a predetermined rate of speed relative to the travel of the conveyor, and means whereby an intermediate device is caused to discharge shredded material at a rate different from the rate of discharge from the terminal devices.

4. In mechanism of the class described, the combination with a series of shredding devices, of a traveling conveyor upon which the shredded material from said devices is discharged, means driving the terminal devices of said series at such speed that the discharge of shredded material therefrom is at the same rate as the speed of travel of the conveyor, and means whereby a plurality of intermediate devices are driven at speeds different from that of the terminal devices.

5. In mechanism of the class described, the combination with a forming drum having recesses in its periphery, a presser roll acting directly against the forming drum to press material into said recesses, and means for driving said drum and roll at different peripheral speeds, whereby severing the material into individual units is facilitated by shearing action between the peripheries of said parts.

ELMER W. NOXON.
KENNETH E. GARRISON.